United States Patent Office 3,382,273
Patented May 7, 1968

3,382,273
STABLE, NEUTRAL, WATER-SOLUBLE
DERIVATIVES OF ASPIRIN
Alexander Galat, 126 Buckingham Road,
Yonkers, N.Y. 10701
No Drawing. Filed Oct. 7, 1965, Ser. No. 493,897
4 Claims. (Cl. 260—480)

Ever since the discovery of the valuable analgesic and antipyretic properties of acetylsalicylic acid (aspirin) some sixty years ago, continuous attempts have been made to prepare a stable, water soluble, neutral, tasteless derivative of this compound. Such a derivative would offer a number of important advantages over aspirin itself: it could be given in solution form to those patients unable or unwilling to swallow tablets, it would be more readily absorbed and, most important, it would be expected to reduce the incidence of gastro-intestinal disorders resulting from the acid nature and low water solubility (1 g./300 ml.) of aspirin.

Calcium acetylsalicylate was one of the first such derivatives to be synthesized and studied. It is a neutral compound and does not exhibit the characteristic sour, acrid taste of aspirin. It is readily soluble in water (1 g./6 ml.) and a large number of clinical studies have shown it to be readily absorbed from the gastro-intestinal tract and that it is well tolerated by patients.

However, calcium acetylsalicylate is a very unstable compound. Apparently, neutralization of the carboxyl group in acetylsalicylic acid makes the acetyl group extraordinarily sensitive to hydrolysis and as a result this salt rapidly decomposes on storage with the formation of various breakdown products such as salicylic acid, acetic acid, calcium salicylate and others. It has been reported to decompose completely in two weeks at 37° C. which is equivalent to storage for less than one year at room temperature.

In addition, the storage behavior of calcium acetylsalicylate is unpredictable and erratic. Different batches of the compound, all prepared by the same process, vary in stability, some batches decomposing after several weeks, others after sveeral months while still others remain in apparently good condition for even longer periods only to begin to decompose suddenly at a very rapid rate. This unpredictable behavior may explain the contradictory claims regarding the stability of calcium acetylsalicylate made by various investigators during the past sixty years.

Many efforts have been made to stabilize calcium acetylsalicylate or to prepare stable derivatives of this salt. A partial list of references follows that pertain to the instability of calcium acetylsalicylate and to efforts to remedy this defect by one method or another: U.S. Patents 1,764,933, 1,969,998, 1,993,743, 2,003,374, 2,101,867, 2,158,091, 2,159,214, 2,447,396, 2,900,410; German Patents 704,819 (1941), 806,993 (1951); Chem. & Ind. p. 805, 1955, and J. Am. Pharm. Assoc. 22, 1096, 1933.

Only in a few instances does the prior art present specific data on the actual storage stability of calcium acetylsalicylate itself or its mixtures and derivatives prepared in an effort to overcome the instability of calcium acetylsalicylate per se. Where such specific information is given a storage stability of about one year is considered to be a noteworthy advance. However, storage stability for such a short period is not sufficient for practical purposes. Preferably, a derivative of a drug should be at least as stable as the drug itself which, in the case of aspirin would mean a stability over a period of at least several years. Such a degree of stability has not been achieved with any of the calcium acetylsalicylate products developed in the past.

One object of this invention is to provide stable, neutral, water soluble derivatives of aspirin.

Another object of this invention is to provide stable, neutral, water soluble derivatives of calcium acetylsalicylate.

A further object of this invention is to provide calcium acetylsalicylate diacetamide.

Additional objects of this invention will become apparent as the description thereof proceeds.

I have discovered that the objects of this invention are accomplished by compounds of the following structure:

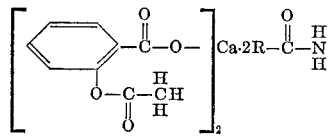

where R=the hydrogen radical or a lower alkyl radical.

The compounds of my invention may be prepared by stirring together calcium acetylsalicylate and an aliphatic acid amide, such as formamide, acetamide or propionamide, in the presence of water or an organic solvent as set forth in the following illustrative but non-limiting example.

EXAMPLE

Equal parts by weight of (a) calcium acetylsalicylate dihydrate, of (b) acetamide and of (c) water were stirred together for about ten minutes following which the resulting mixture was treated with one and one third times its weight of acetone. The resulting crystalline, white product was separated by filtration, washed with acetone and dried at about 50° C. Yield, 75.5% of theory.

The resulting calcium acetylsalicylate diacetamide is readily soluble in water, the aqueous solution thereof being neutral in reaction. M.P. 175–180° C.

Analysis.—Calculated for $C_{22}H_{24}O_{10}N_2Ca$; C, 51.2%; H, 4.65%; N, 5.43%. Found: C, 51.56%; H, 4.92%; N, 5.35%.

Replacing the acetamide of the above example by an equal weight of either formamide or propionamide results in the formation of calcium acetylsalicylate diformamide (M.P. 195–200° C.) or calcium acetylsalicylate dipropionamide (M.P. 155–160° C.) respectively. However, the preferred compound of my invention is the calcium acetylsalicylate diacetamide. The compounds of my invention have the highly desirable and important property of rapidly splitting into calcium acetylsalicylate and the acid amide when brought into contact with aqueous media, such as gastro-intestinal secretions. Accordingly it is important that the acid amide moiety be devoid of toxicity and have no pharmacological action of its own. Now acetamide has an $LD_{50}$ (orally in rats) of 30 g./kg. body weight which places it in the category of non-toxic compounds. (In comparison, aspirin has an $LD_{50}$ (orally in rats) of 1.75 g./kg. body weight.) In addition, acetamide is devoid of any pharmacological effects within the ranges used for present purposes and is thus ideally suited for the stabilization of calcium acetylsalicylate in accordance with my invention.

On the other hand, formamide and propionamide and amides of other aliphatic acids have very appreciably lower $LD_{50}$ values than acetamide and are therefore less desirable for accomplishing the objects of my invention.

The compounds of my invention exhibit a remarkably high degree of stability. Accelerated aging tests were run by maintaining samples of various calcium acetylsalicylates or derivatives in a constant temperature oven at 50–52° C. (Five days at 50–52° C. is approximately equivalent to storage for one year at room temperature.) At intervals, portions of these samples were removed and the salicylic acid content thereof determined colorimetrically (ferric salt method). (One product of the decomposition of the acetylsalicylate ion is the salicylate ion, hence determination of the latter measures the extent of decomposition of the acetylsalicylate.)

The materials for these stability studies were prepared as follows: calcium acetylsalicylate·3½H$_2$O in accordance with U.S. Patent 2,003,374; calcium acetylsalicylate·2H$_2$O in accordance with Ann. Chem., 406, 244, 1914, and calcium acetylsalicylate urea complex in accordance with German Patent 704,819 (1941). The calcium acetylsalicylate diacetamide was prepared as previously described herein.

The results of these tests are given in the table. Percentage decomposition figures in the table have been rounded off to the nearest significant figure. Thus, 0% decomposition does not necessarily mean complete absence of decomposition but rather less than 0.5% decomposition. Similarly, an extent of decomposition within the range 37–38% to 42–43% is listed in the table as 40% decomposition.

It will be seen that the typical behavior of calcium acetylsalicylates or derivatives of the prior art is characterized by an extensive decomposition after only two or three days at 50–52° C. which is equivalent to less than one year at room temperature. It will also be seen that the decomposition after this short initial period proceeds at an extremely rapid rate and is essentially complete in about ten days (equivalent to about two years at room temperature). In contrast the preferred compound of this invention, calcium acetylsalicylate diacetamide, shows no appreciable decomposition after a period of thirty days at 50–52° C. which is equivalent to about six years storage at room temperature. This particular compound can thus be considered infinitely stable for all practical purposes.

[Percent decomposition at 50–52° C.]

| Time, days | 1 | 2 | 5 | 10 | 15 | 30 |
|---|---|---|---|---|---|---|
| Calcium acetylsalicylate·3½H$_2$O | 0 | 0 | 100 | 100 | 100 | 100 |
| Calcium acetylsalicylate·2H$_2$O | 1 | 2 | 5 | 40 | 100 | 100 |
| Calcium acetylsalicylate urea complex | 8 | 19 | 100 | 100 | 100 | 100 |
| Calcium acetylsalicylate diacetamide | 0 | 0 | 0 | 0 | 0 | 0 |

(Some of the above materials, after about 50% decomposition, fused to a glassy mass difficult to dissolve and analyze. Such glassy materials were considered to be completely decomposed for all practical purposes.)

In addition to their great stability during storage, the compounds of my invention are also remarkably stable when exposed to highly humid atmospheres. Thus, calcium acetylsalicylate diacetamide was maintained for three days in air at a relative humidity of 80–85% and showed no increase in weight or change in appearance. It can thus be considered to be non-hygroscopic for all practical purposes.

Finally, the compounds of my invention exhibit another desirable and important property. Although extremely stable on storage and stable at high humidities, nevertheless these compounds dissociate rapidly on contact with water into calcium acetylsalicylate and the acid amide. Thus, when calcium acetylsalicylate diacetamide is stirred with its own weight of water it goes into solution at first, then, after a few seconds, a crystalline precipitate of calcium acetylsalicylate forms. This property is highly desirable since the pharmacological effect of the compound is due solely to calcium acetylsalicylate therein, which compound, as is well known, exhibits valuable analgesic and antipyretic properties. The acid amide serves only to form a calcium acetylsalicylate derivative of extremely high environmental stability and fortunately the acid amide moiety is rapidly split off when the compound is used therapeutically.

Be it remembered that while this invention has been described in connection with specific details and specific embodiments thereof, these details and embodiments are illustrative only and are not to be considered limitations on the spirit and scope of said invention except in so far as these may be incorporated in the appended claims.

I claim:
1. Compounds of the formula

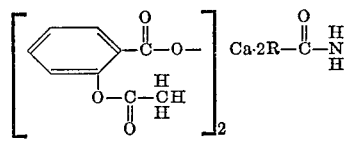

where R is a radical selected from the group consisting of the hydrogen radical and lower alkyl radicals.
2. Calcium acetylsalicylate diacetamide.
3. Calcium acetylsalicylate diformamide.
4. Calcium acetylsalicylate dipropionamide.

References Cited

UNITED STATES PATENTS 2,447,396   8/1948   Coplans _____ 260—480

LORRAINE A. WEINBERGER, *Primary Examiner.*

M. G. BERGER, *Assistant Examiner.*